United States Patent [19]

Tartar

[11] 4,139,106
[45] Feb. 13, 1979

[54] DEVICE FOR EMPTYING A SILO, AND SILO CONSISTING OF SUCH A DEVICE

[76] Inventor: Adolphe A. Tartar, 139, rue Jean Jaures, Wizernes, France, 62570

[21] Appl. No.: 799,075

[22] Filed: May 20, 1977

[30] Foreign Application Priority Data

May 24, 1976 [FR] France ............... 76 15612

[51] Int. Cl.² ............................................ B65G 65/42
[52] U.S. Cl. .................................. 214/17 D; 222/226; 222/290; 222/328
[58] Field of Search ............. 214/17 R, 17 D, 17 DA, 214/17 DC; 222/196, 199, 200, 226, 290, 317, 328; 198/550, 557, 616

[56] References Cited

U.S. PATENT DOCUMENTS

| 3,025,981 | 3/1962 | Hannes | 214/17 DC |
| 3,095,098 | 6/1963 | Maaloe | 214/17 R |
| 3,232,486 | 2/1966 | Ofner | 222/196 X |
| 3,606,037 | 9/1971 | Peterson et al. | 214/17 DA |
| 3,877,587 | 4/1975 | Ishizaki | 214/17 D |

Primary Examiner—Robert G. Sheridan
Attorney, Agent, or Firm—Keil & Witherspoon

[57] ABSTRACT

Devices for emptying a cylindrical or prismatic silo of ensilaged granular and/or pulverulent material, said devices embodying (a) a conical or pyramidal deflector, located at the lower part of silo, its axis 4 converging perceptibly with that of the silo, its apex directed upwards, and its base, together with interior silo wall, defining a horizontal annular corridor (b) at least one scraper which, guided by a drive system along and above the corridor, displaces the products toward a discharge outlet for the products, this outlet opening into the corridor through an opening located at a right angle with the zone swept by the scraper.

12 Claims, 8 Drawing Figures

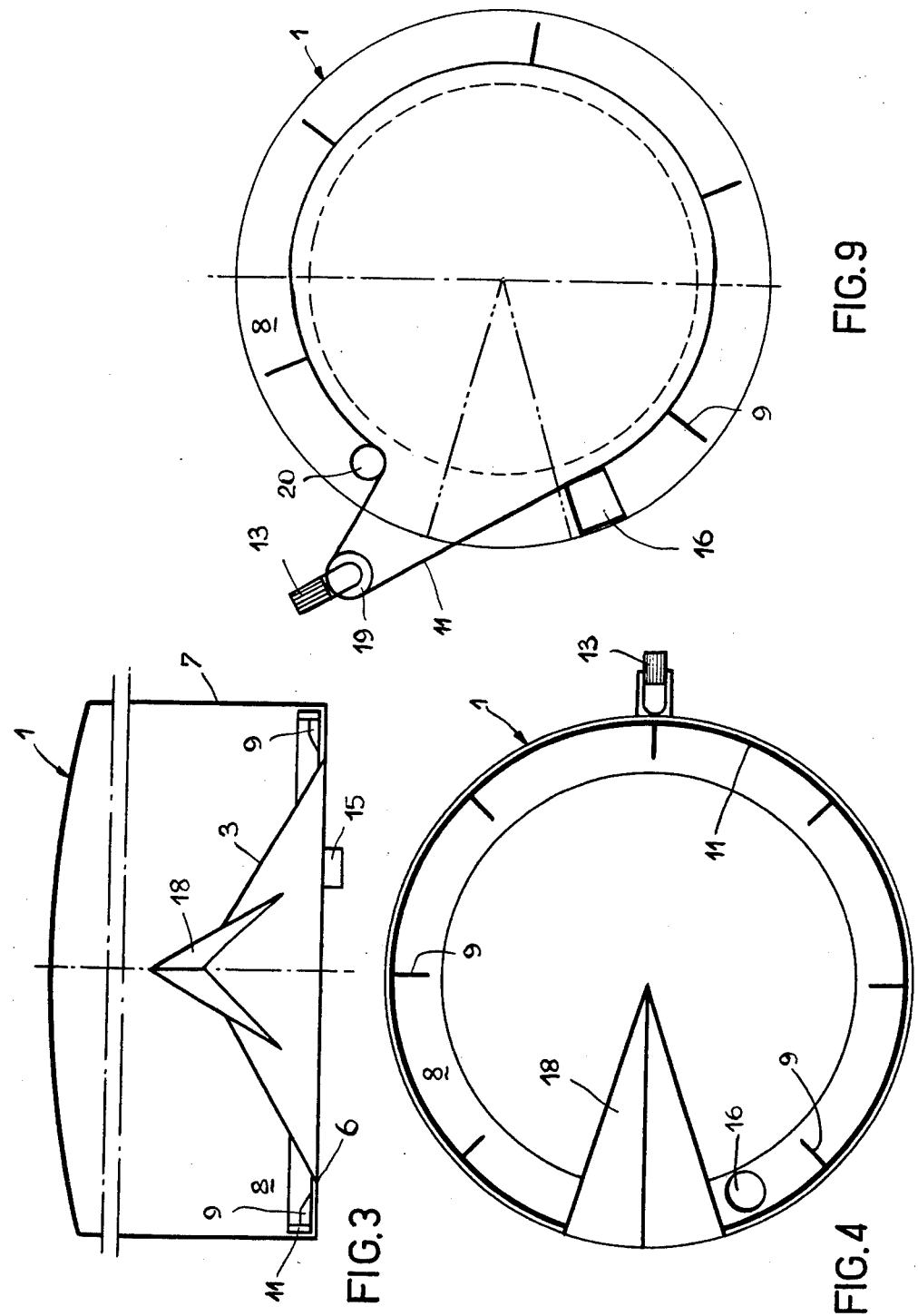

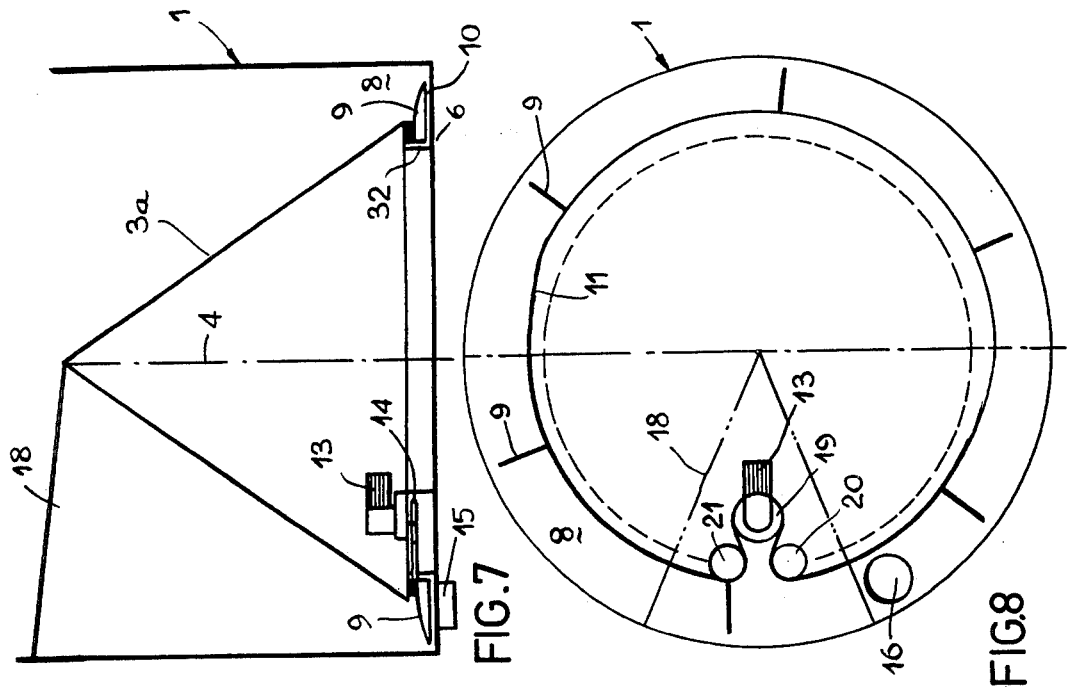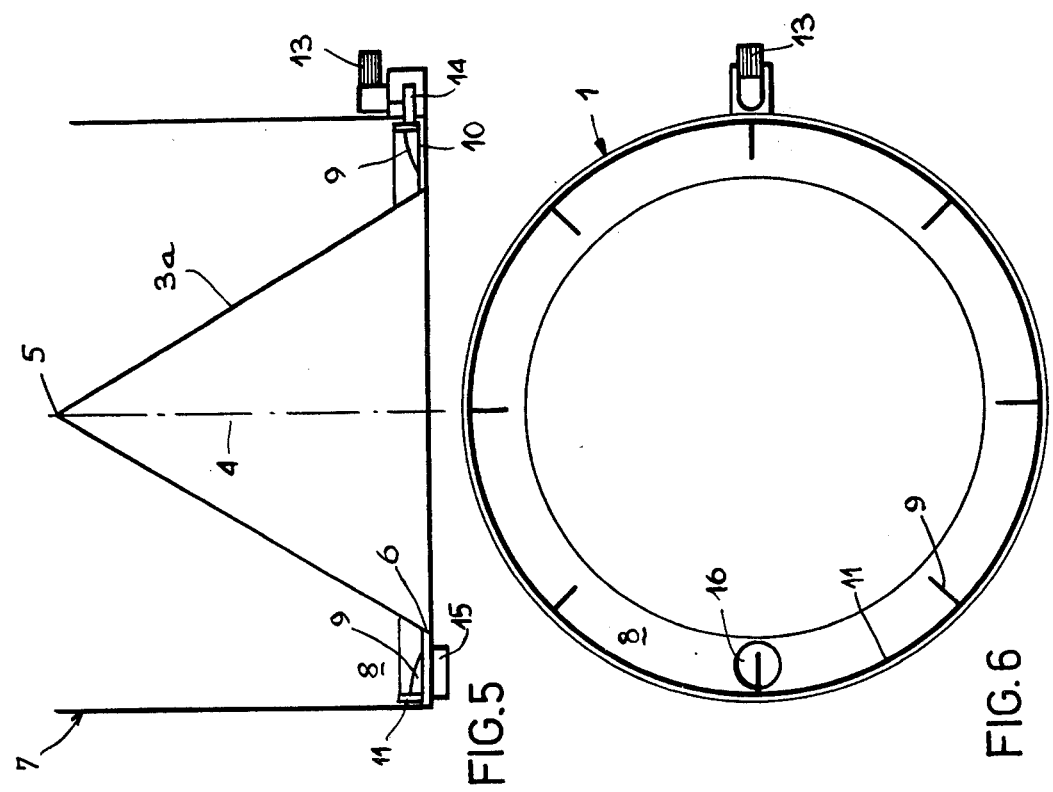

DEVICE FOR EMPTYING A SILO, AND SILO CONSISTING OF SUCH A DEVICE

STATEMENT OF THE INVENTION

The present invention is a device for emptying a cylindrical or prismatic silo of ensilaged granular and/or pulverulent products. The invention also pertains to a silo equipped with the above-mentioned device to carry out the emptying process.

BACKGROUND OF THE INVENTION

It is known that seeds, cereals, flours and fertilizers are generally stored in rather high reservoirs known as silos, whose general shape is cylindrical or prismatic. These silos are loaded from the top and emptied at the bottom by the extraction of the ensilaged products, which are then fed into a screw conveyor, a chain conveyor, a belt or pneumatic conveyor or else loaded onto a vehicle in bulk.

Delivering ensilaged products to a conveyor or a vehicle is rather difficult to guarantee, especially in the case of pulverulent products because of their very poor flow characteristics.

The first silos used for this operation had conical-shaped bottoms. The walls converged downwards to an orifice for the discharge of ensilaged products. The advantage of this type of construction is that it facilitates the flow of products to the outlet, which travel along the inclined wall of the bottom cone, are extracted from the silo, fall by gravity to fill a conveyor or load a truck. Nevertheless, there are two disadvantages to this first form of construction: first, over the entire height of the bottom cone of each silo, the loss of useful volume for product storage, as compared to the volume of a flat-bottom silo of the same height and the same section, is equal to twice the interior volume of the bottom cone. Second, it is clear that the silo can not rest on the ground on its conical bottom portion; consequently, is must be provided with a strong bottom support, which unfortunately increases considerably the price of the silo installed at the operation site.

A flat bottom silo was first designed to eliminate the considerable loss in useful volume of the silo due to the conical outlet at the bottom. The products were emptied by means of and along an Archimedean screw, mounted horizontally above the bottom of the silo and on a diameter of the latter; the said extraction screw rotating on its longitudinal axis and simultaneously pivoting around the vertical symmetry axis of the silo.

Because of the double rotation of the Archimedean screw, the ensilaged products are carried to an outlet orifice provided either in the silo bottom or at the base of its vertical lateral wall.

This second construction also has its disadvantage. The Archimedean screw supports the entire mass of products; consequently, the torque needed for its movement has to be considerable, especially for high density, poor flow products (plaster or fertilizer, for example). Because of this fact, the Archimedean screw soon becomes unusable in favorable conditions. To overcome these drawbacks, a flat-bottom silo was then designed, having above its bottom portion a conical deflector, its apex turned toward the top of the silo and its lateral wall connected to a vibrating motor. When this vibrator is turned on, the ensilaged products flow regularly and continuously along the deflector, fall to its base and onto the wall of a conical receiver located under the deflector and equipped with a central opening for the extraction of products.

The first disadvantage of this third design is that the conical receiver at its extreme bottom part constitutes a considerable loss in useful volume for the silo. It is quite true that the height of the receiver is definitely less than that of the cone terminating the bottom part of the silo in the first design, but, nevertheless, the loss in useful volume still exists and this characteristic is always unfortunate, for it must be remembered that the characteristic property of a silo is that it is able to store a maximum volume of products.

The second and far more important disadvantage of this third design has already been discussed in the preceding paragraphs: Since a vibrating deflector placed above a conical receiver is used at the bottom part of the silo, it is obvious that such a silo can not be directly placed on the ground. The same support system as the one mentioned above has to be implemented, increasing, on the one hand, the silo cost, and the support system constituting, on the other hand, another loss in useful volume since it is impossible to store products over the entire overall height of the silo.

As described for example in French Pat. No. 1 165 985, there is also a fourth type of silo construction, in which the emptying apparatus is composed of discharge conveyors in the form of bands or belts.

In this type of construction, the silo is of irregular section, an upper cylinder extending downwards by means of a step in the form of a parallelepipedic foot. The arrangement of this foot, corresponding to a widening of the silo base, is necessary to decompress the ensilaged products in the zone where they are delivered to the conveyors.

The drawback of this fourth construction is obvious. It is particularly costly because, from the architectural point of view, it is much more complicated to design a cylinder resting on a parallelepiped than a cylinder alone, the latter being the easiest shape to construct where silos are concerned.

To overcome this structural difficulty, a further silo design was adopted, entirely cylindrical and flat-bottomed, such as the one described in German patent application No. 2 140 239.

In a construction of this type, in the bottom portion of the silo, above its bottom surface, there is a conical deflector joined to counter-bibs provided on the inner face of the vertical silo wall, level with the deflector. This facilitates the flow of ensilaged products by a kind of baffle arrangement.

This fifth construction still has two major drawbacks which are inherent to the actual design of the baffle arrangement. In the first place, the ensilaged products are progressively compressed while flowing, necessarily causing irregular flow and poor operation of the extraction device. In the second place, the extraction means provided in the fifth device is composed of a moving extractor placed downstream of a fixed horizontal table in the shape of a circular ring, this table being backed against the deflector base or against the vertical wall base. Due to this horizontal table arrangement, it is obvious that a portion of the materials to be extracted will stagnate on the table and form a residual volume ressembling a sloping heap, partly supported on the table and partly backed against the vertical wall of the deflector or silo. There is no way to extract this heap from the silo, unless an additional manual operation is put into effect outside the silo. In other words, the drawback of this fifth construction is that it causes a large portion of the products to stagnate on the fixed table to the point of rotting unless workmen use rakes to extract them.

DESCRIPTION OF THE INVENTION

The present invention seeks to remedy the disadvantages mentioned above, and for this purpose, proposes a device for emptying a silo which, generally without any modification, can be adapted to the bottom of any silo, and more particularly, to the bottom of a flat silo, the section of which, in addition, is perfectly regular over its entire height.

According to the invention, fitting the device to the bottom part of a flat-bottom silo makes it possible to eliminate all loss in useful volume for the storage of products. It also makes it unnecessary to construct a support between the silo and the ground, since the flat-bottom silo can very easily be placed directly on the ground, or even positioned on a concrete table a few centimeters high designed to facilitate its anchoring.

From the point of view of construction, fitting the device according to the invention to the bottom part of a silo of regular section over its entire height constitutes an important simplification.

Therefore, the object of this invention is a new industrial product: a device for emptying ensilaged granular and/or pulverulent products from a cylindrical or prismatic silo. The device is composed of the following: (a) a conical or pyramidal deflector set at the lower part of the silo, its vertical axis coinciding perceptibly with that of the silo, its apex turned upwards, and its base, together with the interior silo wall, defining a horizontal annular corridor; the above-mentioned deflector being equipped with a vibrating motor generating vibrations along the conical or pyramidal lateral surface of the deflector. (b) A scraping mechanism which, guided by a driving system along and above the corridor, moves the products towards a discharge outlet for the products, this outlet emptying into a corridor through an opening located beneath and at a right angle with the zone swept by the scraping mechanism.

In a preferred design, the width of the horizontal annular corridor is adjustable. For example, the protective blades can be moved along the lateral surface of the deflector. As a result, the width of the horizontal annular corridor can be adjusted according to the flow properties of the ensilaged products. In addition, once the width is known, it would be very easy to determine the flow of products from the silo by a simple adjustment of the scraping mechanism's drive system speed and of the discharge outlet opening.

In a first alternative design, the scraping mechanism consists of at least one scraper, adapted to move over the bottom of the corridor; the scraper or scrapers extending over the entire width of the corridor bottom and fixed on a drive chain in order to sweep the corridor completely. In this design, the drive chain of the product extracting scraper(s) is equipped with a motor reduction gear unit and a chain on which the scraper or scrapers are fixed. Since the scrapers sweep the entire corridor bottom, it is clear that the progressive and regular extraction of all ensilaged material is possible with the invention's device, without fear of seeing one bit of this material stagnate in the form of a sloping heap as was the case in the fifth construction conceived according to prior art.

In a second alternative design, the scraping mechanism consists of an annular belt, adapted to move above the bottom of the corridor. This belt is arranged so as to cover the entire bottom of the corridor and is joined to a fixed scraper located downstream of the discharge outlet and serving as a stop for the products transported by the belt.

With these two alternatives, at least one or more of the drive system means of the scraping mechanism used for product extraction can be located outside the silo.

The supervision, protection and maintenance of the drive system is thus considerably improved because its most important parts, or at least its most fragile parts, can be placed outside the silo, thus not having to bear the load of the ensilaged products.

It is very clear that the invention also pertains to a silo having at least one of the above-mentioned characteristics.

In the principal alternative design, the device in the invention is joined to a flat-bottom silo. In this regard, we should remember that there are two main advantages to using a flat-bottom silo: to eliminate all loss in useful storage volume inside the silo, and to eliminate the need for a support structure between the silo and the ground.

In this principal design, the silo is either laid directly on the ground, the discharge outlet being dug in the ground; or raised by a slab on which the silo is directly placed, the discharge outlet being drilled into the slab.

In another alternative, a housing for the protection and maintenance of the drive system of the emptying device is provided at the base of the silo. For example, the housing can be set above the drive means. This housing can extend inside the silo, from the vertical lateral wall to the top of the interior deflector. Since the entire bottom part of the silo dominated by this housing will not support any load of ensilaged products, it is clear that the length of the drive means, permanently protected, is considerably increased.

Finally, it is advantageous for the silo to be of completely regular section over its entire height. This simplifies considerably the construction and decreases significantly the installation costs.

THE ILLUSTRATED EMBODIMENT

To better understand the object of the present invention, we will now describe, by way of examples that are purely illustrative and non limitative, several alternative designs of embodiments of the invention are illustrated, wherein:

FIG. 3 is a side view of the device in FIG. 2.

FIG. 4 is a top view of the emptying device in FIG. 2.

FIG. 5 is a side view of the second alternative design of the device in the invention, alternative in which the deflector forms a cone whose apex angle is very small.

FIG. 6 is a top view of the device in FIG. 5.

FIG. 7 is a side view of the third alternative design of the emptying device in the invention, alternative in which the drive controls, inside the silo, are protected by an inspection housing.

FIG. 8 is a top view of the device in FIG. 7.

FIG. 9 is a top view of the fourth alternative design of the invention.

Figure 1:
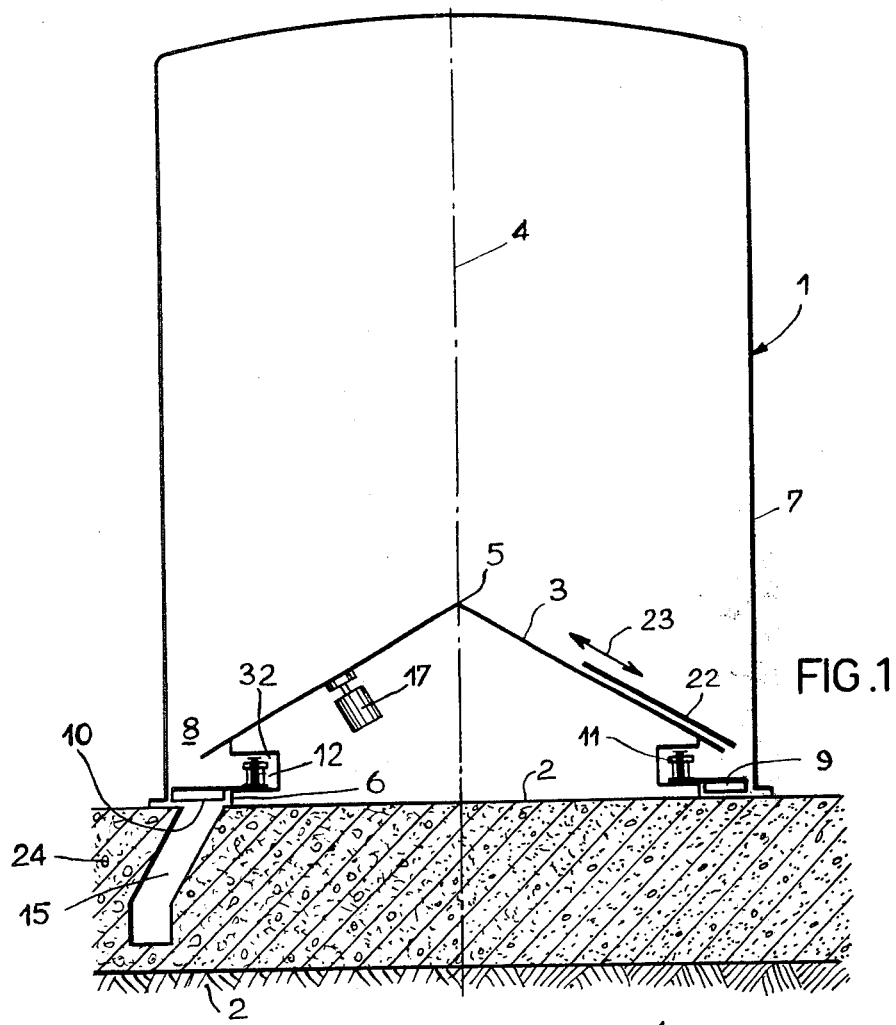
FIG. 1 is a side view of a flat-bottom silo equipped with the emptying device of the invention.

By referring to the diagram, we can see that 1 designates in its entirety a rather tall, flat-bottom cylindrical silo. To better understand the design, in the side views of the design, we can see that the front part of the lateral side wall has not been shown; this permits full visibility of the emptying device.

On the flat-bottom 2 of the silo, a conical deflector 3 is mounted, its vertical axis being substantially identical with that of the silo. Its apex 5 is turned toward the top of the silo.

Together with the interior face of the vertical silo wall 7, deflector base 6 defines a horizontal annular corridor 8, which is circular in the accompanying figures because of the cylindrical design of the silo and the conical design of the deflector. However, it is clear that the present invention can be applied to all forms of silos, and that, for example, a pyramidal deflector may be joined to a prismatic silo in order to define, between base 6 of this pyramidal deflector and vertical wall 7 of the prismatic silo, an annular horizontal corridor 8 of constant width. In this latter case, corridor 8, for example, will consist of a succession of rectilinear paths of identical length.

To better understand the design, only the alternative design with the cylindrical silo and the conical deflector, giving a circular form to annular horizontal corridor 8, has been shown.

At least one scraper 9, and preferably several scrapers, are placed at regular intervals in corridor 8, preferably transversely, their scraping faces 10 being turned toward silo bottom 2.

All the scrapers 9 are joined to drive chain 11, for example, by means of pins 12, each one passing through a link of chain 11. The movement of the chain and, consequently, of the transverse scraper 9 along the corridor, is controlled, for example, by a motor-reduction gearing unit joined to a horizontal pinion 14 meshing with the chain. In this regard, it is noteworthy that the pins of the chain links work vertically, and this arrangement is entirely original, because in all techniques it is customary for these pins to work horizontally.

Finally, the emptying device in the invention is completed by a spout 15, which, for the discharge of the ensilaged products, leads into corridor 8 through an opening 16 located at a right angle of the zone swept by the scrapers 9 when they are driven by the chain.

In all cases, the conical deflector must bring about the progressive and regular descent of the ensilaged products into the peripheral corridor 8. For this purpose, the deflector is equipped with a vibratory motor 17, which is fixed on the lateral wall of the cone and, through repeated vibrations, brings about the downward movement of the ensilaged products from the top to the base of the cone.

Figure 2:
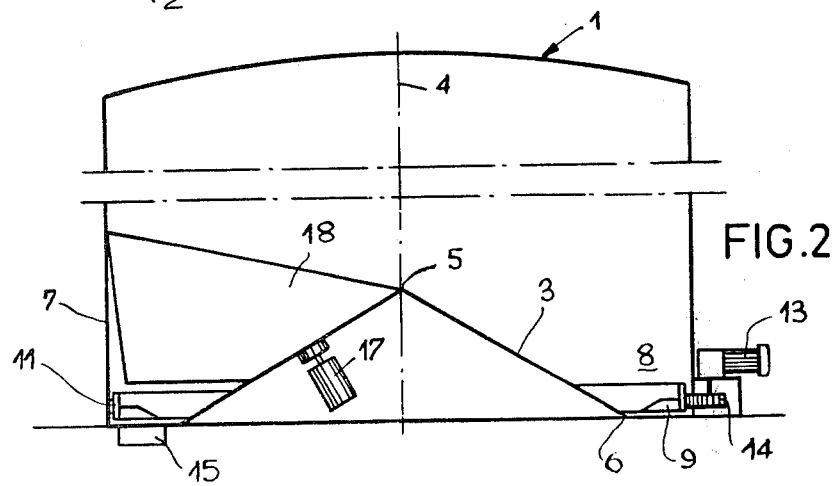
FIG. 2 is a side view of the first alternative design of the emptying device of the invention in FIG. 1. This is the alternative in which the components of the drive system are located outside the silo.

As a general rule, the cone has a large angle at the top, on the order of 90 to 150 degrees (FIGS. 1, 2 and 3). However, for certain products with poor flow properties, use will be made of a deflector equipped with a vibratory motor 17, and, in addition, composed of a cone having a small angle at the apex, on the order of 50 to 90 degrees. In the latter case, the greater slope of the lateral wall of the cone will aid the fall of products along that wall to the peripheral corridor (deflector 3a in FIGS. 5 and 7).

The purpose of the scrapers 9 joined to chain 11 driven by motor-reduction gearing unit 13 is to pick up from corridor 8 the ensilaged products flowing along the lateral surface of deflector 3 or 3a, this operation being caused by vibrations produced by vibratory motor 17.

The ensilaged products picked up by the scrapers are then moved along and above the silo bottom; i.e., above the bottom of the corridor, towards opening 16 of discharge outlet 15 for the products.

Various alternative designs for the scraper-chain-motor-reduction gearing unit assembly are possible.

In the alternative design in FIGS. 2,3 and 4, the motor-reduction gearing unit is located outside the silo, and it drives pinion 14, acting on a chain arranged along the outer edge of annular corridor 8.

In the alternative design in FIGS. 7 and 8, the motor-reduction gearing unit is placed inside the silo. In this case, a housing 18 is advantageously provided to protect the motor-reduction gearing unit from having to bear the mass of ensilaged products.

In addition to its protective function, and notably when it extends from the vertical lateral wall 7 of the silo to conical deflector 3 or 3a, the housing 18 can be used as a passage for a worker in charge of the supervision and maintenance of the drive system in general and the motor-reduction gearing unit in particular. Furthermore, when housing 18 is indeed provided inside the silo, spout 15 empties into corridor 8 through an opening 16 located outside the housing. In the alternative design in FIGS. 7 and 8, it can be seen that the chain passes over three guide pinions 19,20 and 21, so as to extend substantially along the inner edge of corridor 8.

In the alternative design in FIG. 9, the motor-reduction gearing unit 13 is located outside the silo and the chain 11 passes over two pinions 19 and 20 arranged, one inside corridor 8, the other outside the silo, so that the chain can be pulled in a tangential direction.

Finally, in another alternative design, and referring more particularly to FIGS. 1,7 and 8, it can be seen that chain 11 is embedded at the bottom of groove 32, extending regularly around the entire deflector, in the base of the latter. Here, chain 11 is even more protected from the ensilaged mass and consequently, its life and reliability will be greatly improved.

On the lateral surface of deflector 3 or 3a, it is equally advantageous to provide a blade protruding very slightly from the deflector so as to extend above corridor 8 and provide still further protection for the chain; i.e., to protect the chain from being subjected to the pressure of the ensilaged products and even from having contact with them.

Figure 10:
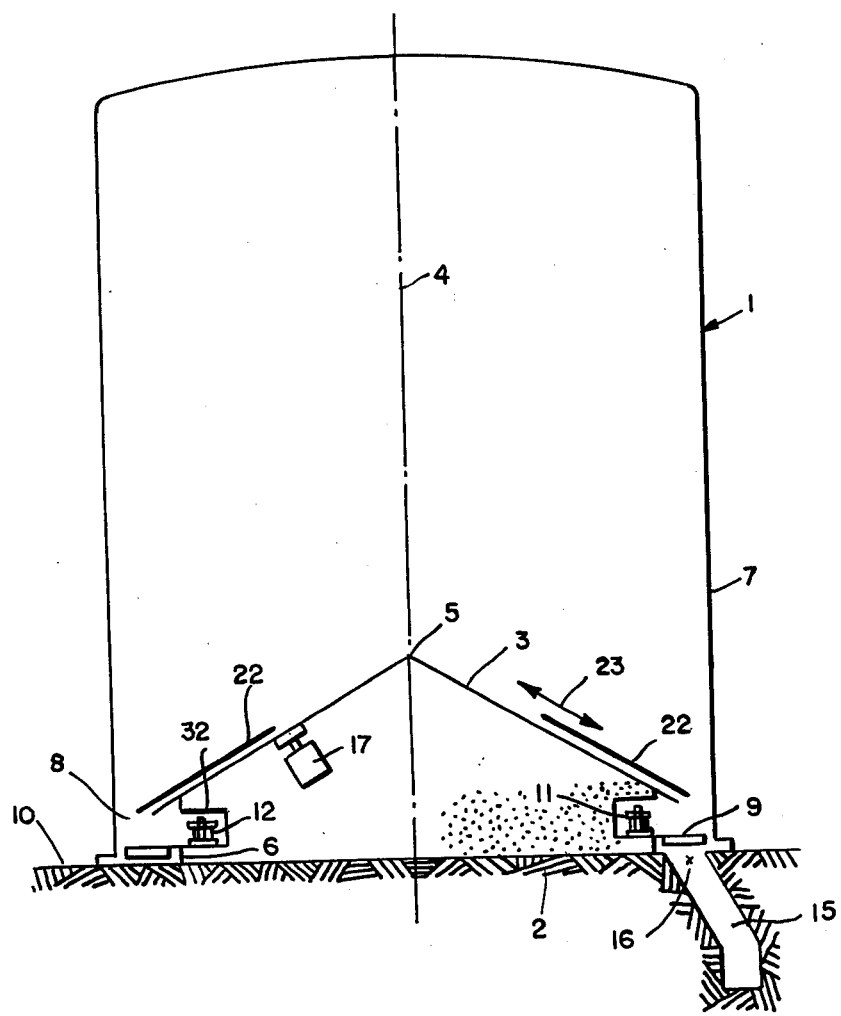
FIG. 10 is a side view of another alternative design of the invention.

In the last alternative design, as shown in FIG. 10, the conical wall constituting the lateral surface of the deflector can be comprised of several overlapping sheets 22, the movement of which, along the lateral surface of the deflector, as indicated by arrow 23, permits adjustment of the width of corridor 8. The silo in this case is mounted directly on the ground, which constitutes the flat bottom 2 of the silo. Moreover, it is clear that a. the width of corridor 8, in itself dependent on the position of sheets 22,
b. the dimensions of opening 16 of the discharge outlet,
c. the speed at which scrapers 9 are driven by chain 11 constitute the three parameters that determine the flow of products discharged from the silo. These parameters can obviously be controlled, for example when controlling the flow, to enable this same flow to be modified. Finally, it is recalled that one of the essential advantages of the emptying device illustrated is that it can be fitted to a flat-bottom silo, so that the usual losses in volume occurring at the bottom part of today's silos are completely eliminated.

Given the silo's flat bottom, two installation variations can easily be designed:

a silo that is laid directly on the ground (right half of FIG. 1) and in this case spout 15 is dug in the ground;

a silo that is raised by slab 24, in concrete for example, on which it is directly placed, the outlet spout being drilled into the slab (left half of FIG. 1).

Whatever construction is adopted, the bottom of the spout will obviously be provided with conventional means to ensure the transport or transfer of discharged products to a vehicle or to a conveyor.

It is also recalled that another advantage of the emptying device is that is can be used unmodified on a cylindrical or prismatic silo of perfectly regular section over its entire height. It will easily be understood that this is possible by referring to FIG. 1, which shows that the ensilaged products are decompressed in the zone where they arrive at scrapers 9 to be then carried off by them. It can also be seen that scrapers 9 occupy transversely the entire width of corridor 8, so that all materials flowing freely along deflector 3, then falling in corridor 8, are automatically picked up, transported and then discharged from the silo when they fall through opening 16 of discharge outlet 15.

Naturally, the invention is not any more limited to the types of applications than it is to the types of design mentioned here, and there could be several alternative applications without departing from the scope of the present invention. More especially, it is to be remembered that the device can be applied for emptying any type of granular and/or pulverulent products because, as soon as vibrations are generated along the deflector and scrapers 9 are driven, the regular extraction of ensilaged products inside corridor 8 is permanently ensured, so as to bring them to spout 15 through which they are discharged in a constant flow.

For driving chain 11 which carries one or more scrapers 9, it is also possible to provide a second chain as a replacement for the pinion-motor-reduction gear system. This second chain forms a smaller loop and, equipped with special teeth to interlock with chain 11, it controls by its own movement the driving of chain 11. This second drive chain is, of course, protected from the mass of ensilaged products: for example, it is embedded under the deflector or placed in an external casing adjacent the silo. It is also to be remembered that the scraping mechanism in the invention ensures the extraction of all materials. This is because the scrapers 9 rake the entire surface of the corridor, making it impossible that any particle of material be left in the silo. The ensilaged mass descends progressively when the vibrations are generated and the scraping mechanism driven. And this mass is extracted progressively; i.e., the mass at the lower part of the silo is discharged before the mass at the top part. Therefore, if a new quantity of products is put into the silo through the top, it is very clear that the oldest products will be discharged as soon as the emptying device in this invention is operated. In this way, product stagnation inside the silo is avoided, and this implies that the discharged products are always in good condition.

For certain products such as carbonate of lime, the drive system may become clogged. To prevent or minimize damage to chain 11 and its driving means, the scraper-chain assembly is advantageously replaced by an annular belt, which moves above the corridor bottom. The belt is placed so as to totally cover the corridor bottom (always ensuring total extraction) and joined to a fixed scraper located downstream of opening 16 of discharge outlet 15, and used as a stop for the products transported by the belt.

This last design joins with the previously proposed general construction, combining a conical deflector equipped with a vibratory motor and a scraper mechanism which sweeps the entire surface of the annular corridor, defined between the deflector base and the silo base, and opening to an outlet 16 through which the ensilaged products are extracted.

What is claimed is:

1. A device for emptying silaged particulate solids in a silo, comprising, a conical or pyramidal deflector having its vertical axis through its upper point substantially identical with the vertical axis of the silo and having the periphery of its base spaced inwardly from the interior side of the silo wall to define therebetween a horizontal annular corridor about said deflector and within said silo, an endless member within the silo and movable by drive means through a horizontal path adjacent said annular corridor, and a plurality of scrapers projecting from said endless member and extending substantially completely across said annular corridor for moving the silaged solids along the corridor to a discharge passage intercepting and extending downwardly from the corridor.

2. A device as claimed in claim 1, wherein a vibratory motor is mounted on said deflector to produce vibrations in said deflector.

3. A device as claimed in claim 1 and means mounted on said deflector for selectively varying the horizontal distance between the peripheral edge of the deflector and the interior side of the silo wall to thereby adjust the width of the annular corridor.

4. A device as claimed in claim 1, wherein said endless member is a chain on which said scrapers are mounted at spaced intervals along the chain.

5. A device as claimed in claim 1, wherein said drive means embodies a motor driving said member through a reduction gear unit.

6. A device as claimed in claim 5, wherein at least part of the drive means for the endless member is located outside the silo.

7. A device as claimed in claim 1, wherein said drive means is located within said silo and beneath said deflector.

8. A device as claimed in claim 1, a housing with sloping walls and an upper apex mounted on the upper surface of the deflector, and said drive means being located in said housing.

9. A device as claimed in claim 1, wherein the bottom wall of said silo is earth and said discharge passage being located within the earth.

10. A device as claimed in claim 1, wherein said silo is supported on a raised slab, and said discharge passage being a passage in said slab.

11. A device as claimed in claim 1, wherein the bottom wall of said silo beneath said deflector is flat.

12. A device for emptying silaged particulate solids in a silo, comprising a conical or pyrimidal deflector having its vertical axis through its upper point substantially identical with the vertical axis of the silo and having the periphery of its base spaced inwardly from the interior side of the silo wall to define therebetween a horizontal annular corridor about said deflector, an annular belt above and completely covering the bottom of the annular corridor and drive means to drive the belt through the corridor toward a discharge passage intercepting and extending downwardly from the corridor, and fixed scraper means downstream from the discharge passage for preventing solids carried by the belt from being conveyed past the discharge passage.

* * * * *